(12) United States Patent
Enzio

(10) Patent No.: US 12,546,418 B1
(45) Date of Patent: Feb. 10, 2026

(54) DIELECTRIC UNION AND METHOD OF ASSEMBLING THE SAME

(71) Applicant: RED-WHITE VALVE CORP., Lake Forest, CA (US)

(72) Inventor: Claudio Enzio, Valduggia (IT)

(73) Assignee: RED-WHITE VALVE CORP., Lake Forest, CA (US)

( * ) Notice: Subject to any disclaimer, the term of this patent is extended or adjusted under 35 U.S.C. 154(b) by 0 days.

(21) Appl. No.: 19/012,665

(22) Filed: Jan. 7, 2025

(51) Int. Cl.
*F16L 25/02* (2006.01)
*F16L 19/02* (2006.01)

(52) U.S. Cl.
CPC ......... *F16L 25/023* (2013.01); *F16L 19/0206* (2013.01); *F16L 19/0218* (2013.01)

(58) Field of Classification Search
CPC ....... F16L 25/023; F16L 25/021; F16L 25/02; F16L 19/0206; F16L 19/0231; F16L 19/0218
See application file for complete search history.

(56) References Cited

U.S. PATENT DOCUMENTS

| | | | |
|---|---|---|---|
| 1,016,620 A * | 2/1912 | Gapp | F16L 19/0231 |
| 1,675,808 A * | 7/1928 | Kliss | F16L 19/0231 |
| 4,927,192 A * | 5/1990 | Ungchusri | F16L 19/0231 |
| 6,581,983 B1 * | 6/2003 | Viegener | |
| 10,053,923 B2 * | 8/2018 | Johnson | F16L 19/0206 |
| 10,352,487 B1 * | 7/2019 | Stephens | F16L 25/023 |
| 11,274,779 B2 * | 3/2022 | Hickman | F16L 25/023 |
| 2009/0160186 A1 * | 6/2009 | McGuire | F16L 19/0231 |
| 2015/0167876 A1 * | 6/2015 | Miller | F16L 19/0231 |
| 2018/0163904 A1 * | 6/2018 | Nguyen | F16L 19/0206 |

* cited by examiner

*Primary Examiner* — William S. Choi
(74) *Attorney, Agent, or Firm* — Womble Bond Dickinson (US) LLP

(57) ABSTRACT

A dielectric union assembly includes a threaded union body having external threads, a press-fit union body including an annular groove extending inward and an annular projection extending outward that defines an annular channel, an inner O-ring configured to be accommodated in the annular channel of the press-fit union body, a nut including a flange and internal threads configured to threadedly engage the external threads of the threaded union body, an insert configured to dielectrically isolate the threaded union body and the nut from the press-fit union body, a flange ring including an annular recess, a retaining ring configured to fit into the annular recess of the flange ring, and a gasket configured to be compressed between the threaded union body and the press-fit union body. An inner diameter of the flange of the nut is less than or substantially equal to an outer diameter of the annular projection.

12 Claims, 19 Drawing Sheets

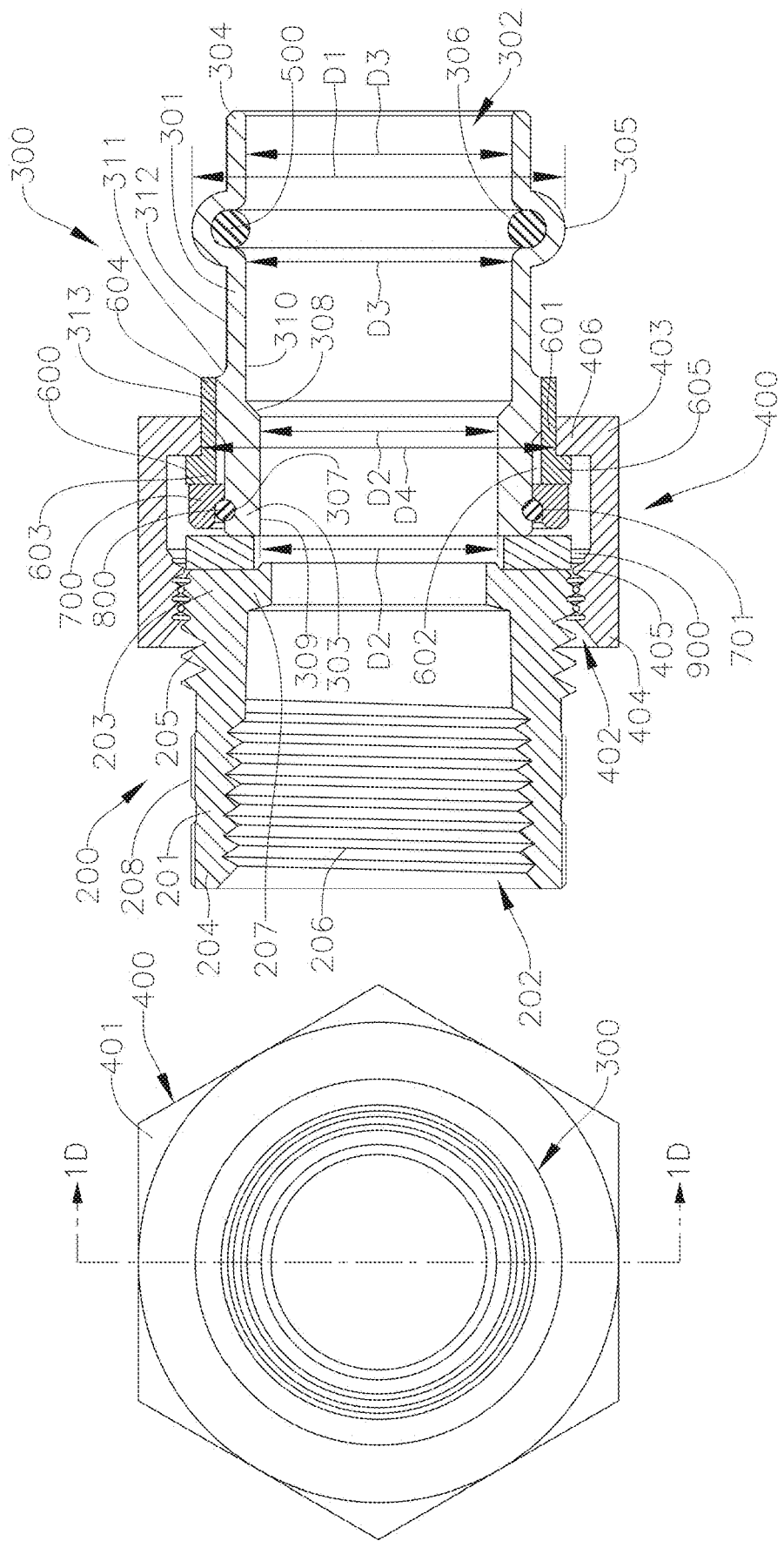

DIELECTRIC UNION AND METHOD OF ASSEMBLING THE SAME

BACKGROUND

1. Field

The present application relates to various embodiments of a dielectric union.

2. Description of the Related Art

A dielectric union is an adapter or fitting that is utilized in piping systems to join dissimilar metals and to prevent the accelerated corrosion or deterioration in the piping system. Dielectric unions typically include a press-fit union body, a threaded union body, and a nut. In conventional dielectric unions, the nut is sized to pass over the widest portion of the press-fit union body, which increases the material utilization and the cost of the dielectric union.

The above-described information disclosed in this section is only for improving the understanding of the background of the present disclosure and thus it may include information that does not constitute prior art.

SUMMARY

The present disclosure relates to various embodiments of a dielectric union assembly. In one embodiment, the dielectric union assembly includes a threaded union body having external threads; a press-fit union body having an annular groove extending inward and an annular projection extending outward that defines an annular channel; an inner O-ring configured to be accommodated in the annular channel of the press-fit union body; a nut including internal threads at one end and a flange at an opposite end, the internal threads being configured to threadedly engage the external threads of the threaded union body; an insert configured to dielectrically isolate the threaded union body and the nut from the press-fit union body; a flange ring including an annular recess; a retaining ring configured to fit into the annular recess of the flange ring and to hold the flange ring in place; and a gasket configured to be compressed between the threaded union body and the press-fit union body. An inner diameter of the flange of the nut is less than or substantially equal to an outer diameter of the annular projection. The nut is configured to be mounted from a first end of the press-fit union body opposite to a second end of the press-fit union body comprising the annular projection.

The annular projection may be the widest portion of the press-fit union body.

The dielectric union assembly may also include a gasket configured to be compressed between the threaded union body and the press-fit union body.

The retaining ring may be a wire ring.

The wire ring may include or be formed of phosphor bronze.

The press-fit union body may include a narrower inner end portion and a wider outer end portion.

The press-fit union body may also include a transition between the narrower inner end portion and the wider outer end portion.

The press-fit union body may include an embossed portion configured to support the insert.

The insert may include an annular lip extending outward, and the flange of the nut may be configured to engage the annular lip of the insert.

In an assembled state: the flange ring may be on an outer surface of the press-fit union body; the insert may be on the outer surface of the press-fit union body and between the flange ring and the annular projection; the inner O-ring may be accommodated in the annular channel of the press-fit union body; the retaining ring may be accommodated in the annular groove of the press-fit union body and the annular recess of the flange ring; the internal threads of the nut may engage the external threads of the threaded union body; the flange of the nut may engage the annular lip of the insert; and the gasket may be compressed between the threaded union body and the press-fit union body.

The threaded union body may include a pipe system connection, and the pipe system connection may include internal threads.

The present disclosure also relates to various embodiments of a method of assembling the dielectric union assembly. In one embodiment, the method includes sliding the nut onto the press-fit union body such that the nut does not pass over the annular projection of the press-fit union body; sliding the insert onto the press-fit union body through the nut; sliding the flange ring onto the press-fit union body through the nut; inserting the retaining ring into the annular groove in the press-fit union body; and threadedly coupling the threaded union body to the nut.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features or tasks may be combined with one or more other described features or tasks to provide a workable dielectric union or a method of assembling a dielectric union.

BRIEF DESCRIPTION OF THE DRAWINGS

The features and advantages of embodiments of the present disclosure will be better understood by reference to the following detailed description when considered in conjunction with the drawings. The drawings are not necessarily drawn to scale.

FIGS. 1A-1D are an exploded perspective view, a side view, an end view, and a cross-sectional view, respectively, of a dielectric union assembly according to one embodiment of the present disclosure;

DETAILED DESCRIPTION

Figure 1A:
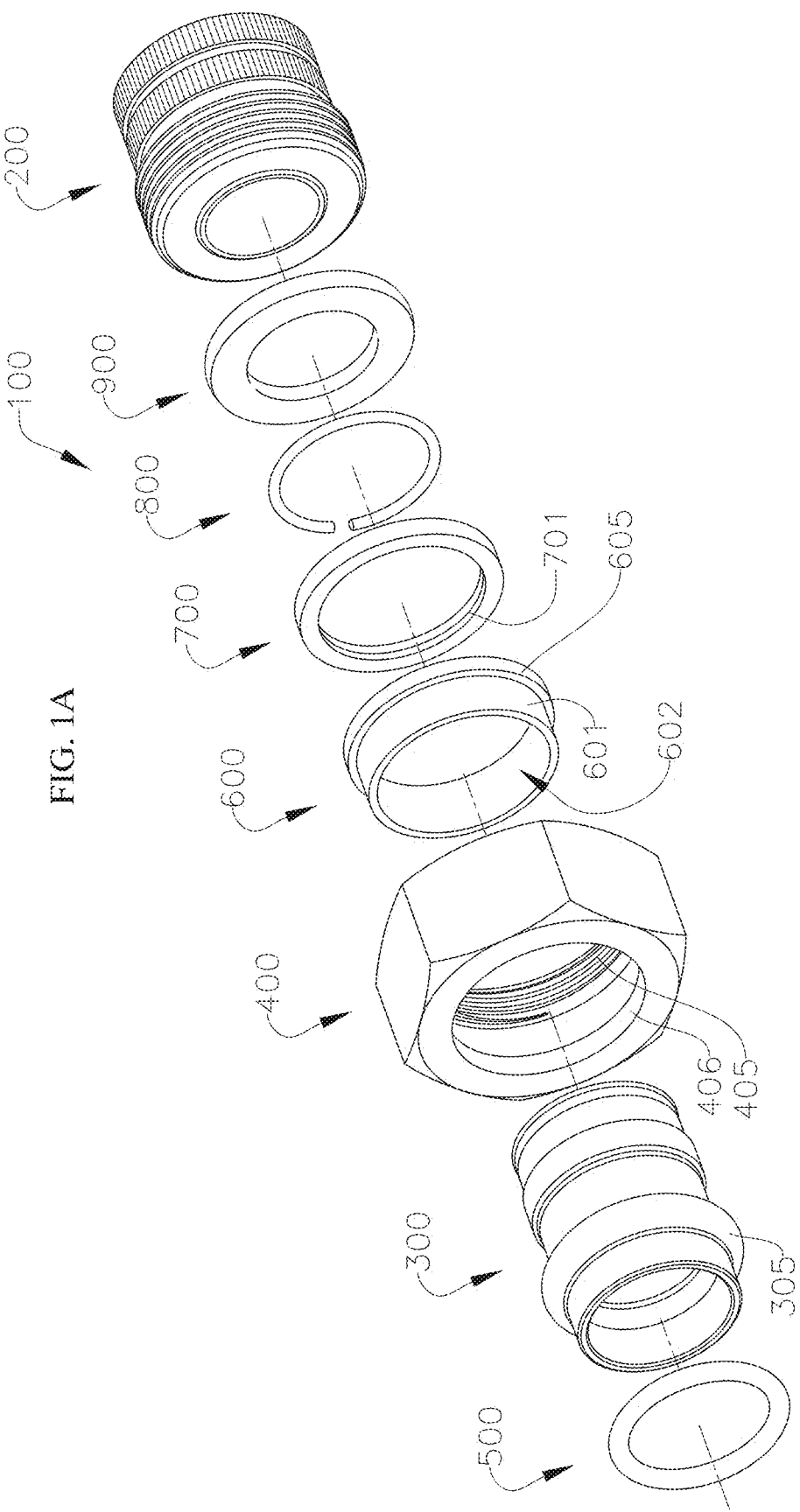
Figure 1B:
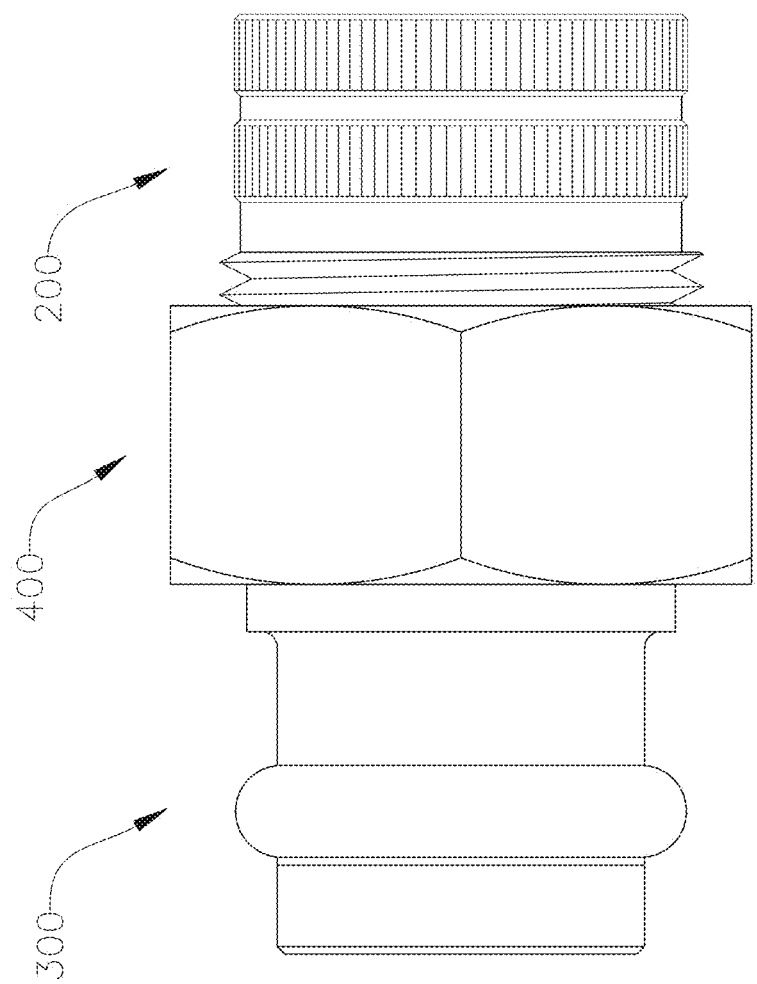

The present disclosure relates to various embodiments of a dielectric union assembly. In one embodiment, the dielectric union assembly includes a threaded union body, a press-fit union body, and a nut configured to couple the threaded union body and the press-fit union body to each other. The press-fit union body includes an O-ring receptacle configured to accommodate an O-ring. In one or more embodiments, the inner diameter of the nut is less than the outer diameter of the O-ring receptacle in the press-fit union body. Accordingly, the amount of material and the associated cost of the nut may be reduced compared to related art dielectric unions in which the nut is oversized to slide over the O-ring receptacle.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference now to FIGS. 1A-1D, a dielectric union assembly 100 according to one embodiment of the present disclosure includes a threaded union body 200, a press-fit union body 300, a nut 400, an inner O-ring 500, an insert 600, a flange ring 700, a retaining ring 800, and a gasket 900.

In the illustrated embodiment, the threaded union body 200 includes a generally cylindrical body 201 defining an opening 202 (e.g., a through hole). The cylindrical body 201 has a proximal end portion 203 and a distal end portion 204. In the illustrated embodiment, the threaded union body 200 also includes outer threads 205 on an outer surface of the cylindrical body 201 at the proximal end portion 203, and a pipe system connection (e.g., inner threads 206) on an inner surface of the cylindrical body 201 at the distal end portion 204 and at an intermediate portion between the proximal and distal end portions 203, 204. The threaded union body 200 also includes an annular flange 207 at the proximal end portion 203 that extends radially inward. In one or more embodiments, the threaded union body 200 may also include one or more friction features (e.g., a knurled surface) 208 on the outer surface of the cylindrical body 201 at the distal end portion 204.

In the illustrated embodiment, the press-fit union body 300 includes a generally cylindrical body 301 defining an opening 302 (e.g., a through hole). The cylindrical body 301 has a proximal end portion 303 and a distal end portion 304. Additionally, in the illustrated embodiment, the press-fit union body 300 also includes an annular projection 305 extending radially outward. The annular projection 305 defines an annular channel 306 on the inside of the cylindrical body 301 in communication with the opening 302. The annular channel 306 is configured to accommodate the inner O-ring 500. In the illustrated embodiment, the annular projection 305 and the annular channel 306 defined by the annular projection 305 are proximate to the distal end portion 304 of the cylindrical body 301 (i.e., the annular projection 305 and the annular channel 306 are closer to the distal end portion 304 than the proximal end portion 303). The annular projection 305 and the annular channel 306 defined by the annular projection 305 may have a curved (e.g., semi-annular) cross-sectional shape. In the illustrated embodiment, the annular projection 305 has an outer diameter D1.

Additionally, in the illustrated embodiment, the press-fit union body 300 includes an annular groove 307 in the outer surface of the cylindrical body 301. The annular groove 307 is configured to accommodate the retaining ring 800. In the illustrated embodiment, the annular groove 307 is proximate to the proximal end portion 303 of the cylindrical body 301. The annular groove 307 may have a curved (e.g., semi-annular) cross-sectional shape.

Furthermore, in the illustrated embodiment, the inner surface of the cylindrical body 301 includes a transition 308 (e.g., a step or taper) between a narrower portion 309 and a wider portion 310 such that the opening 302 defined by the cylindrical body 301 tapers from a narrower diameter portion D2 to a wider diameter portion D3. The narrower portion 309 extends distally from the proximal end portion 303 and the wider portion 310 extends proximally from the distal end portion 304. Additionally, in the illustrated embodiment, the outer surface of the cylindrical body 301 includes a transition 311 (e.g., a step or taper) between a narrower portion 312 and a wider portion 313. The narrower portion 312 extends proximally from the distal end portion 304 and the wider portion 313 extends distally from the proximal end portion 303. The annular projection 305 extends outward from the narrower portion 312 of the outer surface of the cylindrical body 301.

In the illustrated embodiment, the nut 400 includes a prismatic body 401 defining a cylindrical opening 402. The prismatic body 401 has a proximal end portion 403 and a distal end portion 404. The nut 400 also includes inner threads 405 along an inner surface of the prismatic body 401 at the distal end portion 404, and an annular flange 406 at the proximal end portion 403 of the prismatic body 401 extending inward into the cylindrical opening 402. Although in the illustrated embodiment the prismatic body 401 is hexagonal, the present disclosure is not limited thereto and the prismatic body 401 may have any other suitable shape, such as a square body. In the illustrated embodiment, the inner diameter D4 of the cylindrical opening 402 at the annular flange 406 of the nut 400 is less than the outer diameter D1 of the annular projection 305 of the press-fit union body 300.

In the illustrated embodiment, the insert 600 includes a cylindrical body 601 defining an opening 602. The cylindrical body 601 has a proximal end 603 and a distal end 604 opposite to the proximal end 603. The insert 600 also includes an annular lip 605 extending outward from one end of the cylindrical body 601 such that a step is formed between the cylindrical body 601 and the annular lip 605.

The insert 600 is configured to dielectrically isolate the threaded union body 200 and the nut 400 from the press-fit union body 300.

In the illustrated embodiment, the flange ring 700 is a thin annular member including an annular recess 701 in an inner surface. In one or more embodiments, the flange ring 700 may include or be formed of brass.

In one or more embodiments, the retaining ring 800 may be a wire ring. Additionally, in one or more embodiments, the retaining ring 800 (e.g., the wire ring) may include or be formed of phosphor bronze, which is configured to reduce the galvanic corrosion risk compared to steel or stainless steel. In the Galvanic Series (Scale of Nobility), phosphor bronze is located closer to the material of the components in contact with the retaining ring 800 (e.g., brass) than steel or stainless steel, and therefore the use of phosphor bronze reduces the risk of galvanic corrosion.

Figure 2A:
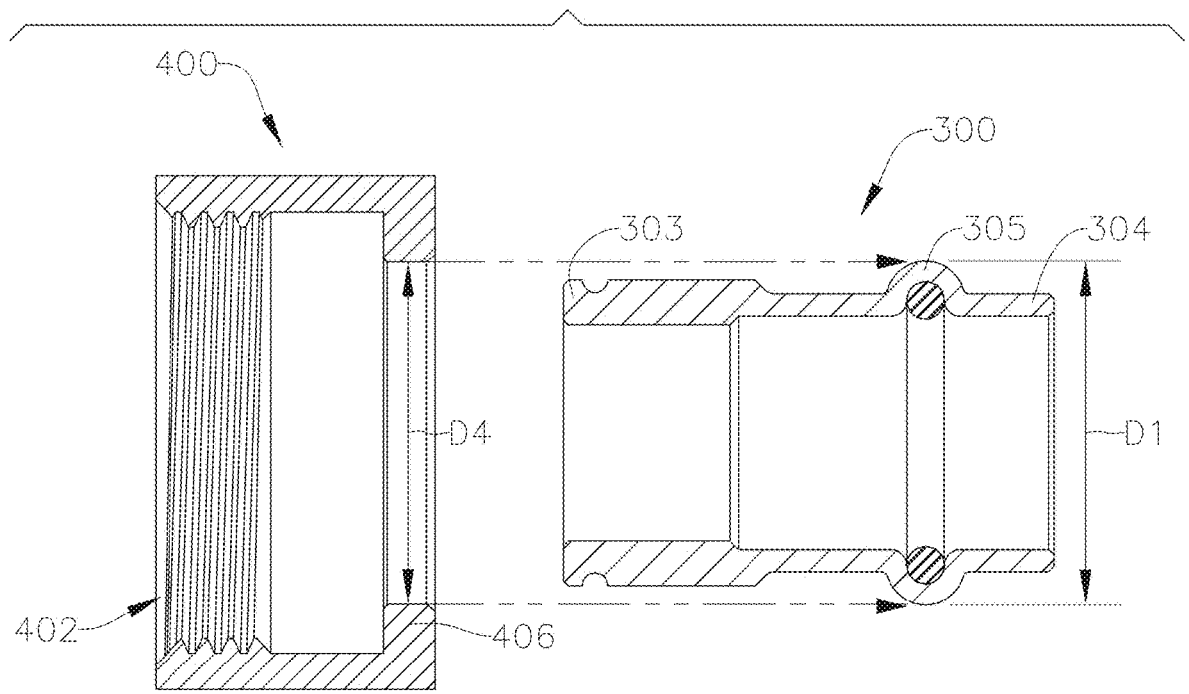
FIGS. 2A-2F depicts tasks of assembling the dielectric union assembly according to one embodiment of the present disclosure.

FIGS. 2A-2D depict assembly of the dielectric union assembly 100. As illustrated in FIG. 2A, the nut 400 and the press-fit union body 300 are moved toward each other such that the proximal end portion 303 of the press-fit union body 300 extends through the annular flange 406 and into the cylindrical opening 402 of the nut 400. Although the inner diameter D4 of the annular flange 406 on the nut 400 is smaller than the outer diameter D1 of the annular projection 305 on the press-fit union body 300 and therefore the nut 400 could not be slid onto the distal end portion 304 of the press-fit union body 300, the nut 400 may be slid onto the proximal end portion 303 of the press-fit union body 300.

Figure 2B:
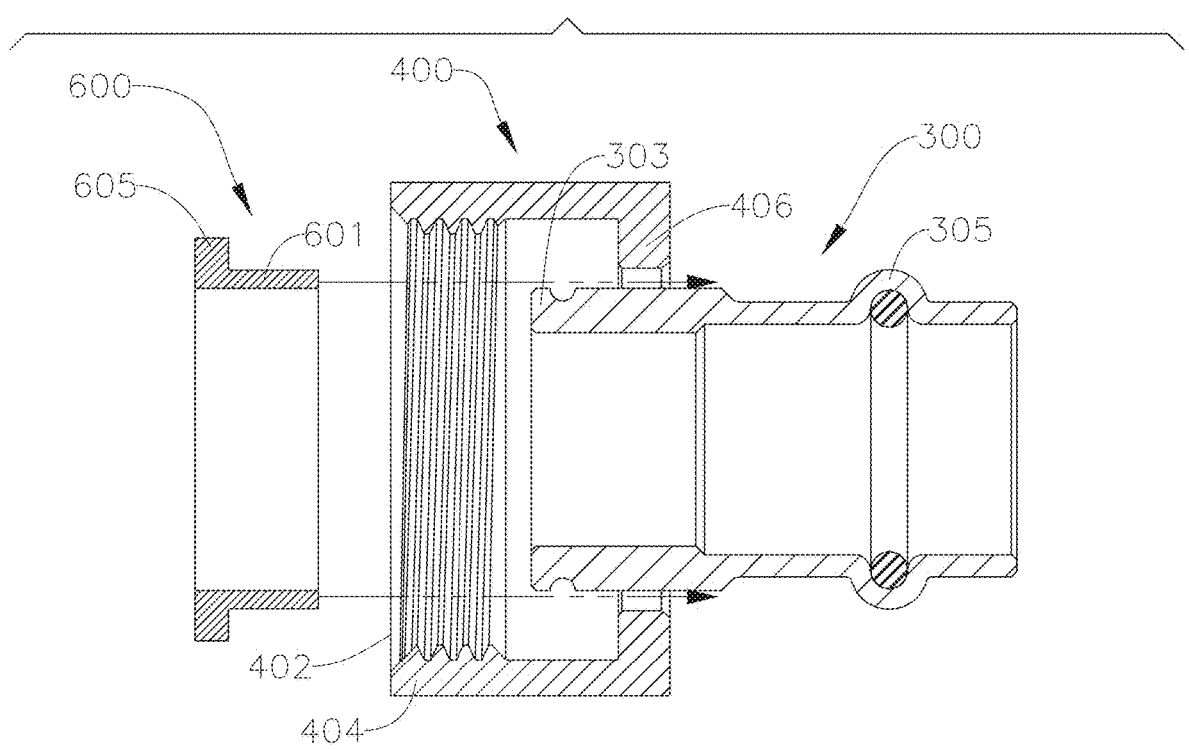
Figure 2C:
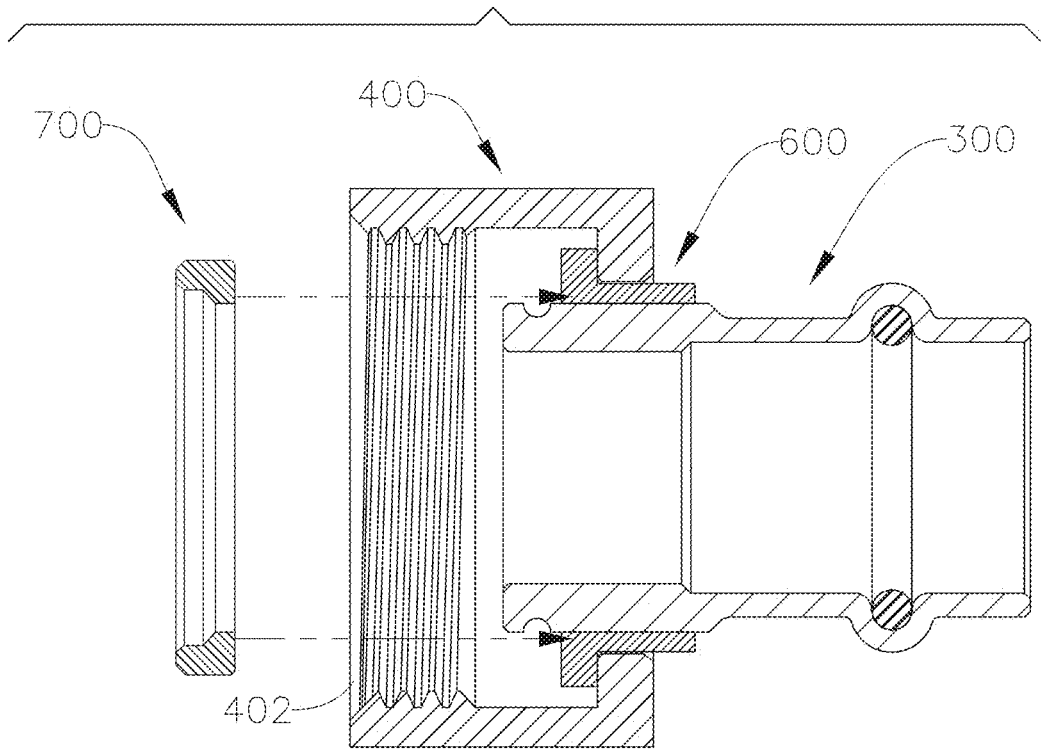

As illustrated in FIG. 2B, the assembly method includes inserting the insert 600 through the distal end portion 404 of the cylindrical opening 402 in the nut 400 and onto the proximal end portion 303 of the press-fit union body 300. The cylindrical body 601 of the insert 600 also extends through the cylindrical opening 402 in the nut 400 and the annular lip 605 of the insert 600 contacts the annular flange 406 of the nut 400.

As illustrated in FIG. 2O, the assembly method also includes inserting the flange ring 700 into the cylindrical opening 402 of the nut 400 and onto the outer surface of the press-fit union body 300 such that the flange ring 700 abuts the insert 600.

Figure 2D:
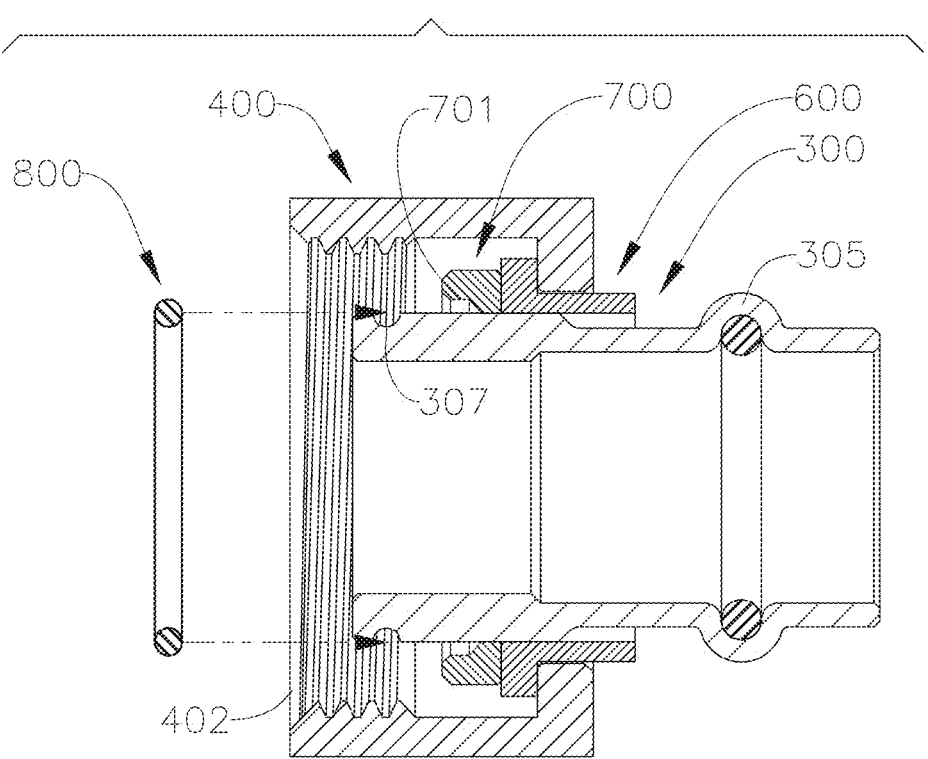

As illustrated in FIG. 2D, the assembly method further includes inserting the retaining ring 800 into the cylindrical opening 402 of the nut 400 and onto the outer surface of the press-fit union body 300 such that the retaining ring 800 is accommodated in the annular groove 307 in the outer surface of the press-fit union body 300 and the annular recess 701 in the inner surface of the flange ring 700.

Figure 2E:
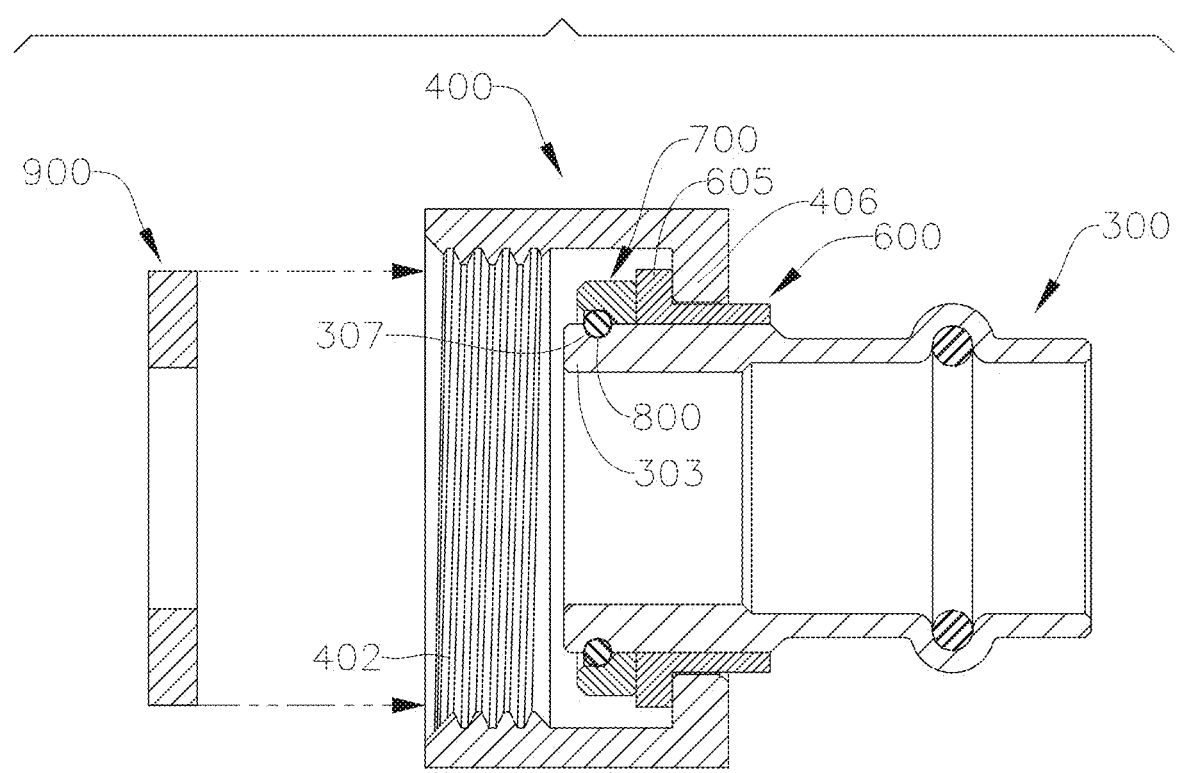
Figure 2F:
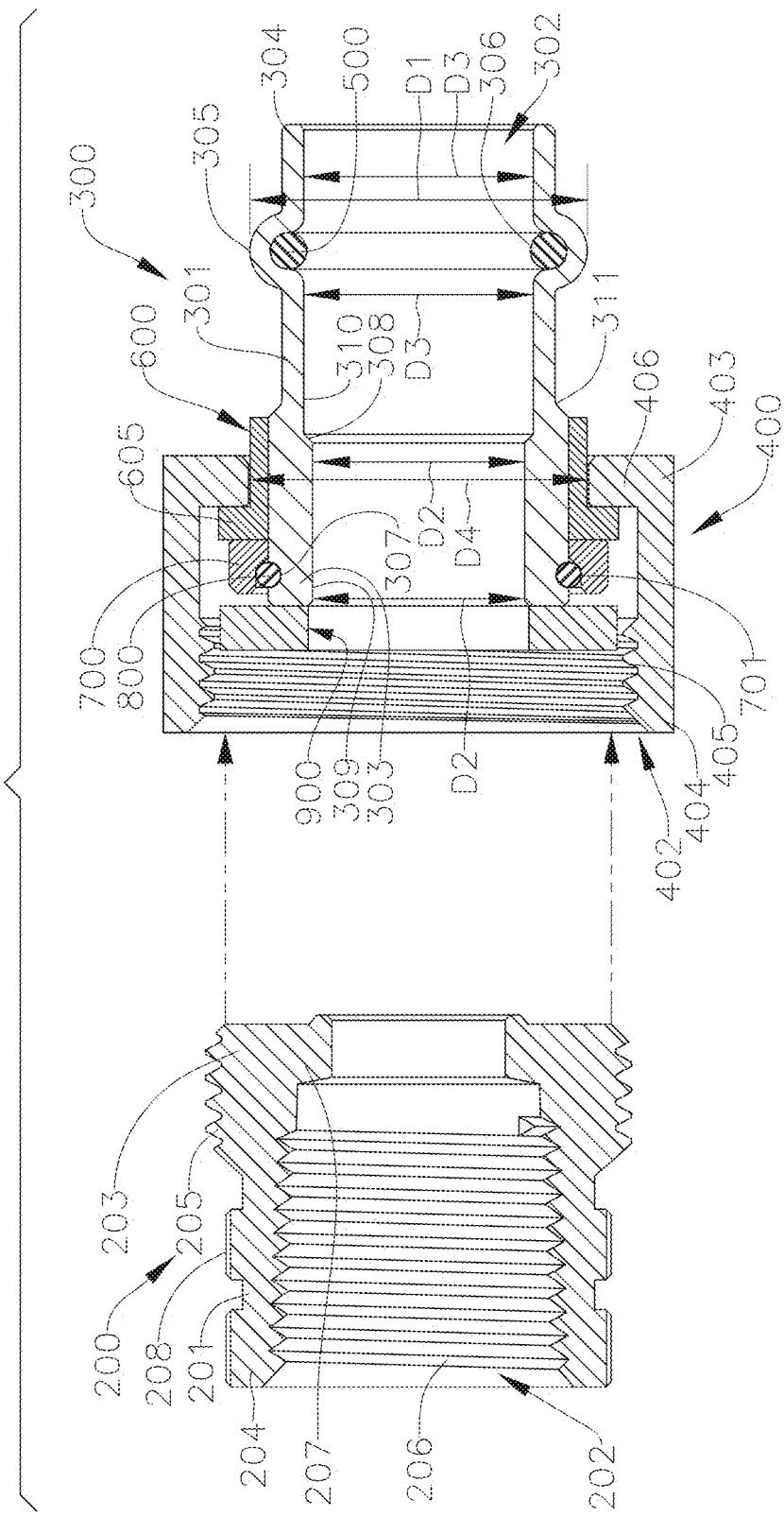
Figure 3A:
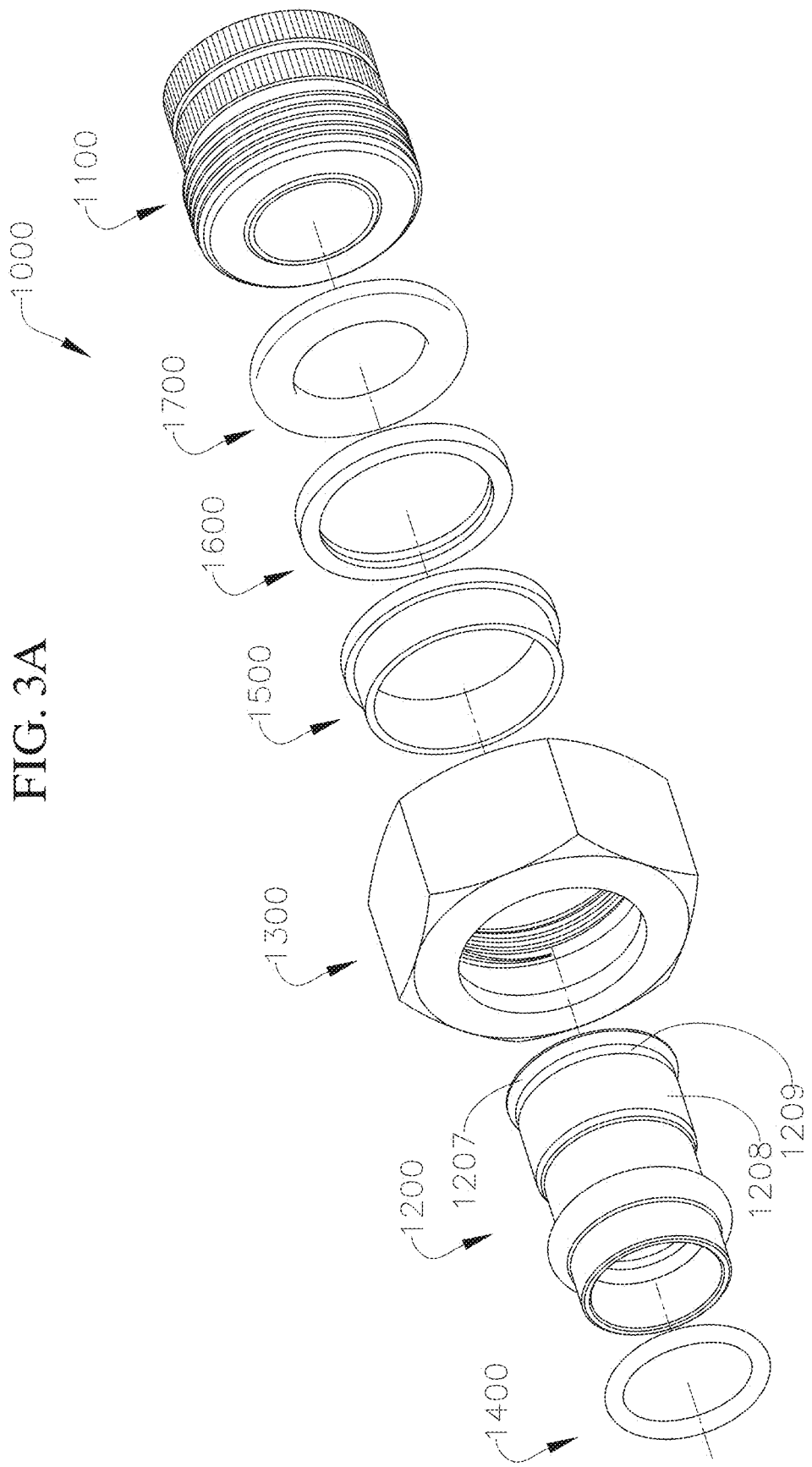
FIGS. 3A-3D are an exploded perspective view, a side view, an end view, and a cross-sectional view, respectively, of a dielectric union assembly according to another embodiment of the present disclosure.
Figure 3C:
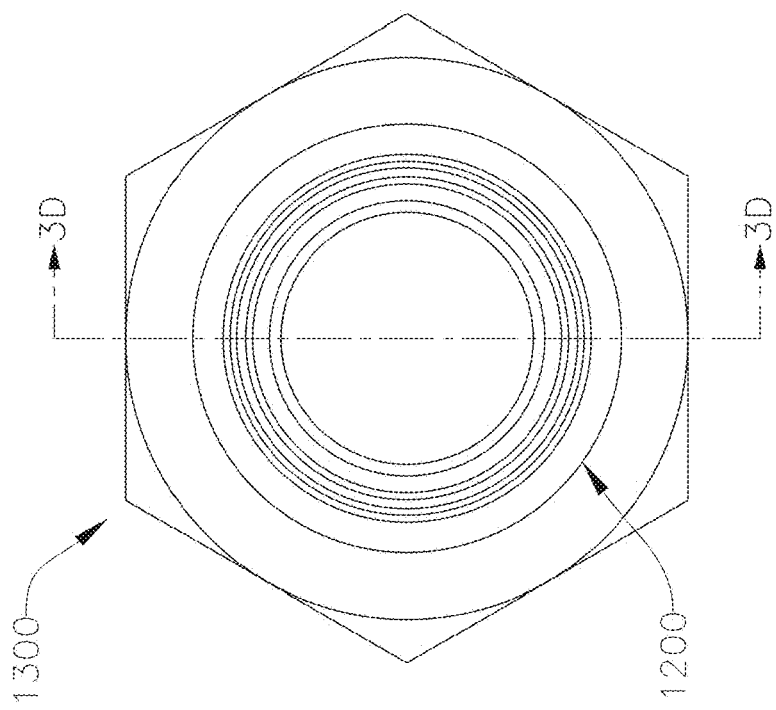
Figure 3B:
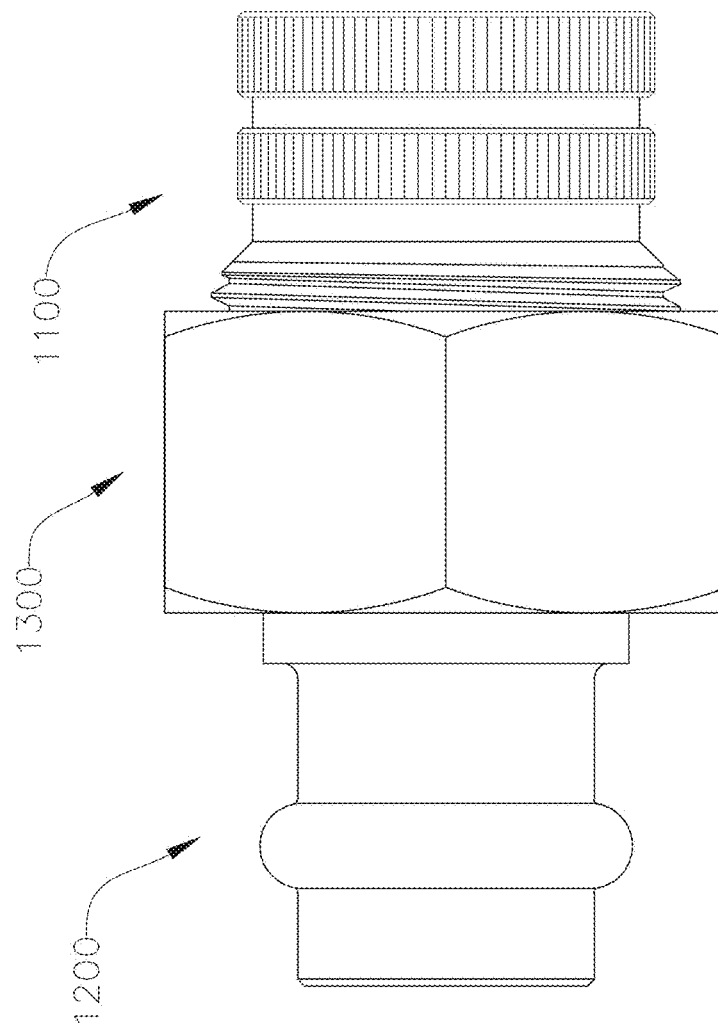
Figure 3D:
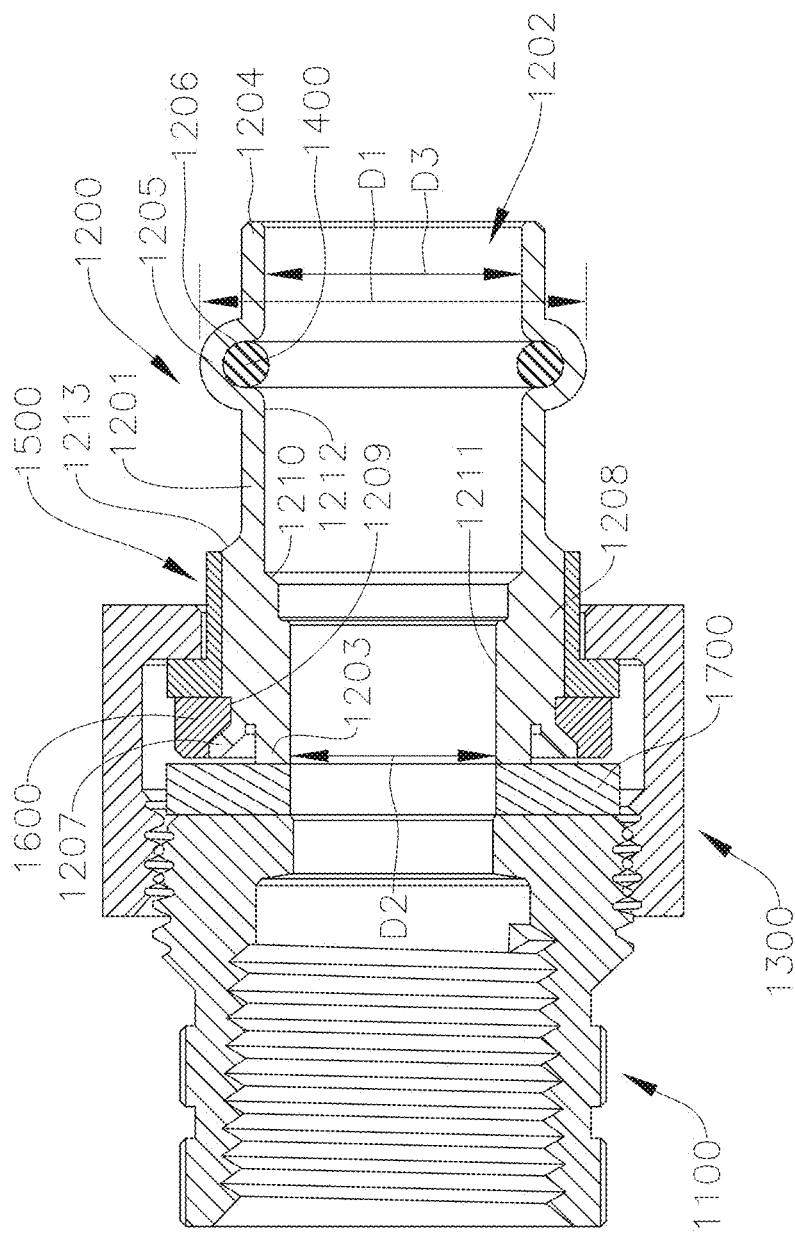
Figure 4A:
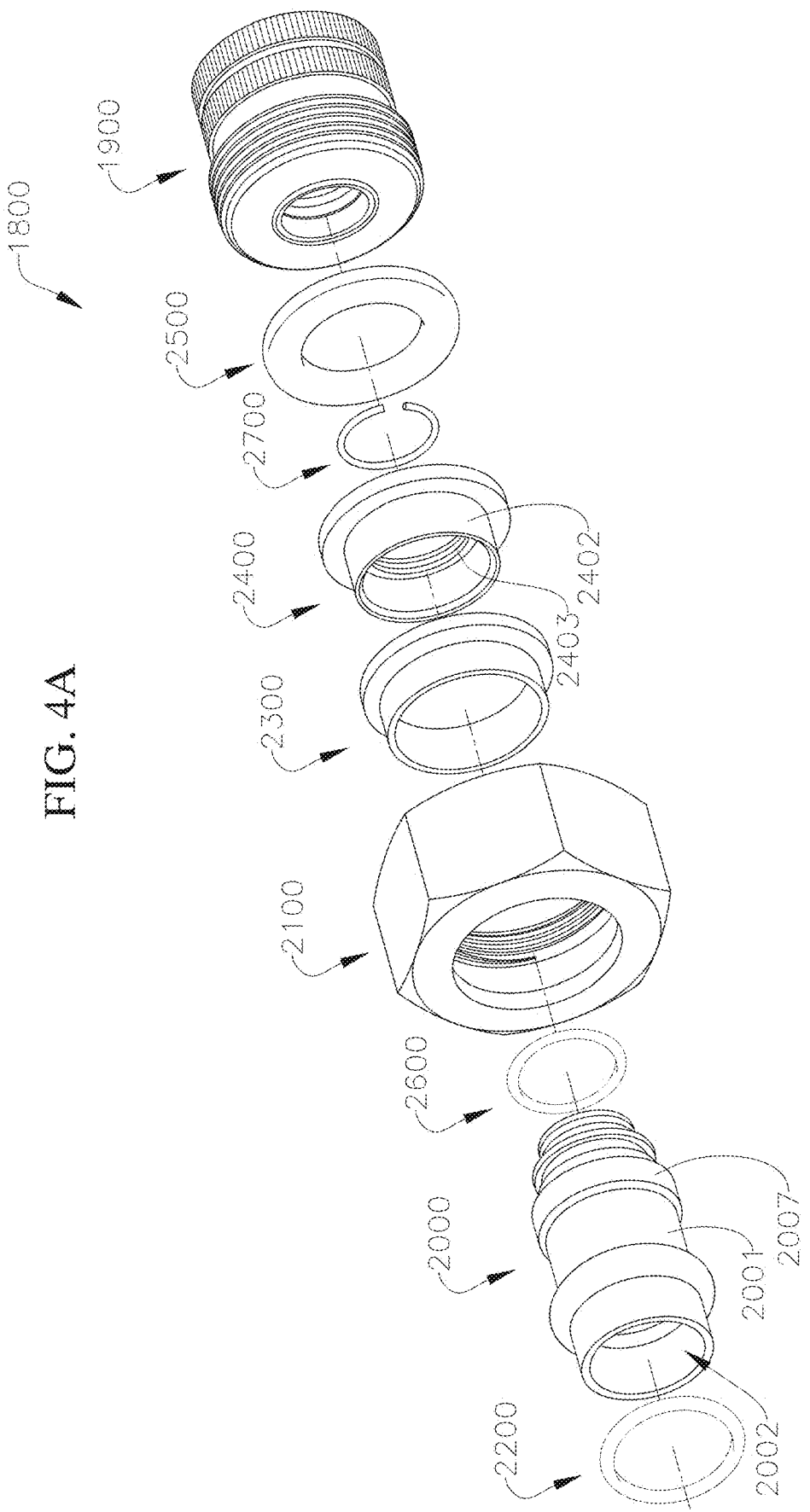
FIGS. 4A-4D are an exploded perspective view, a side view, an end view, and a cross-sectional view, respectively, of a dielectric union assembly according to a further embodiment of the present disclosure.
Figure 4C:
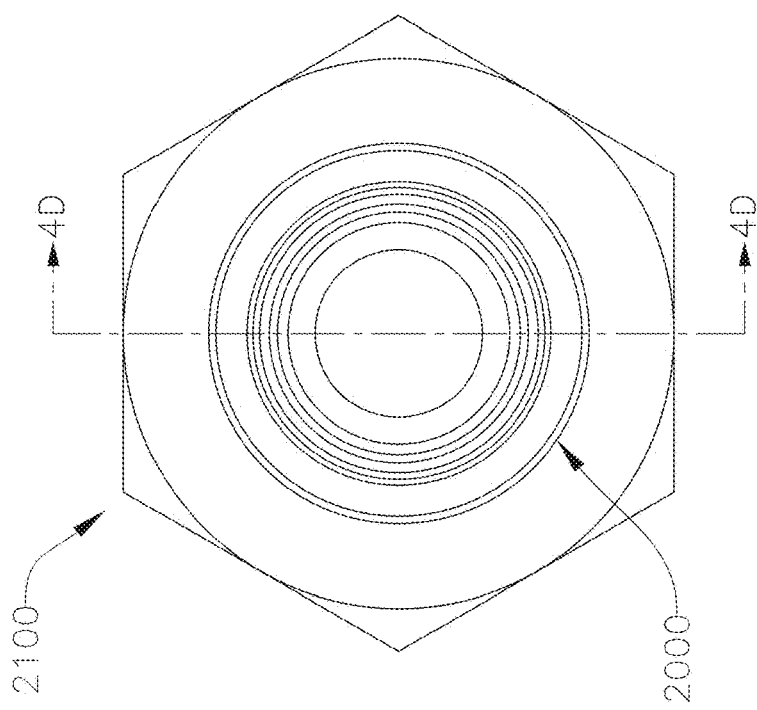
Figure 4B:
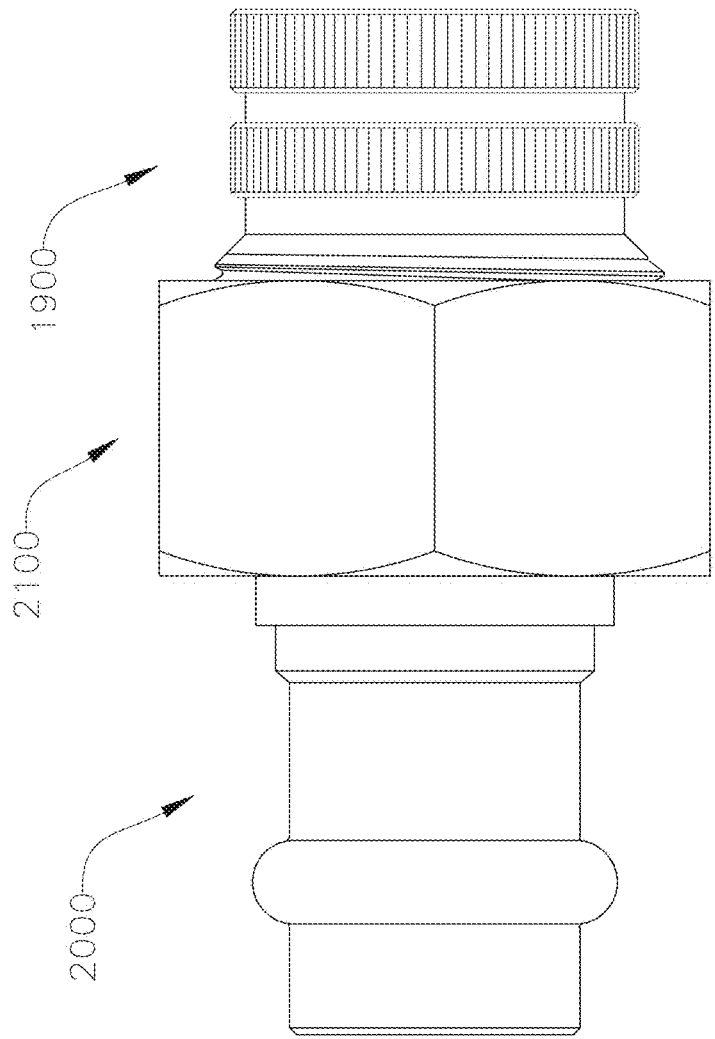
Figure 4D:
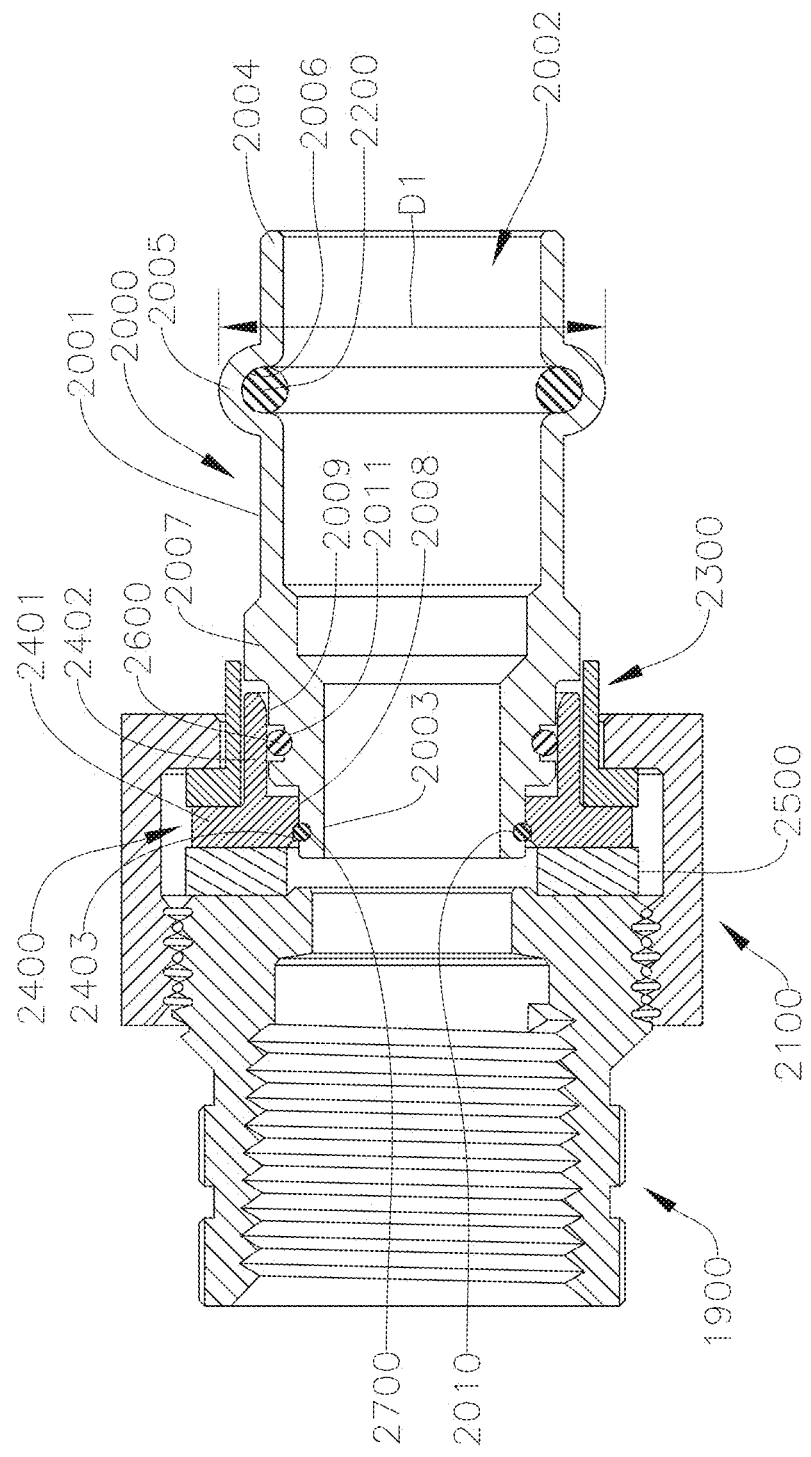
Figure 5A:
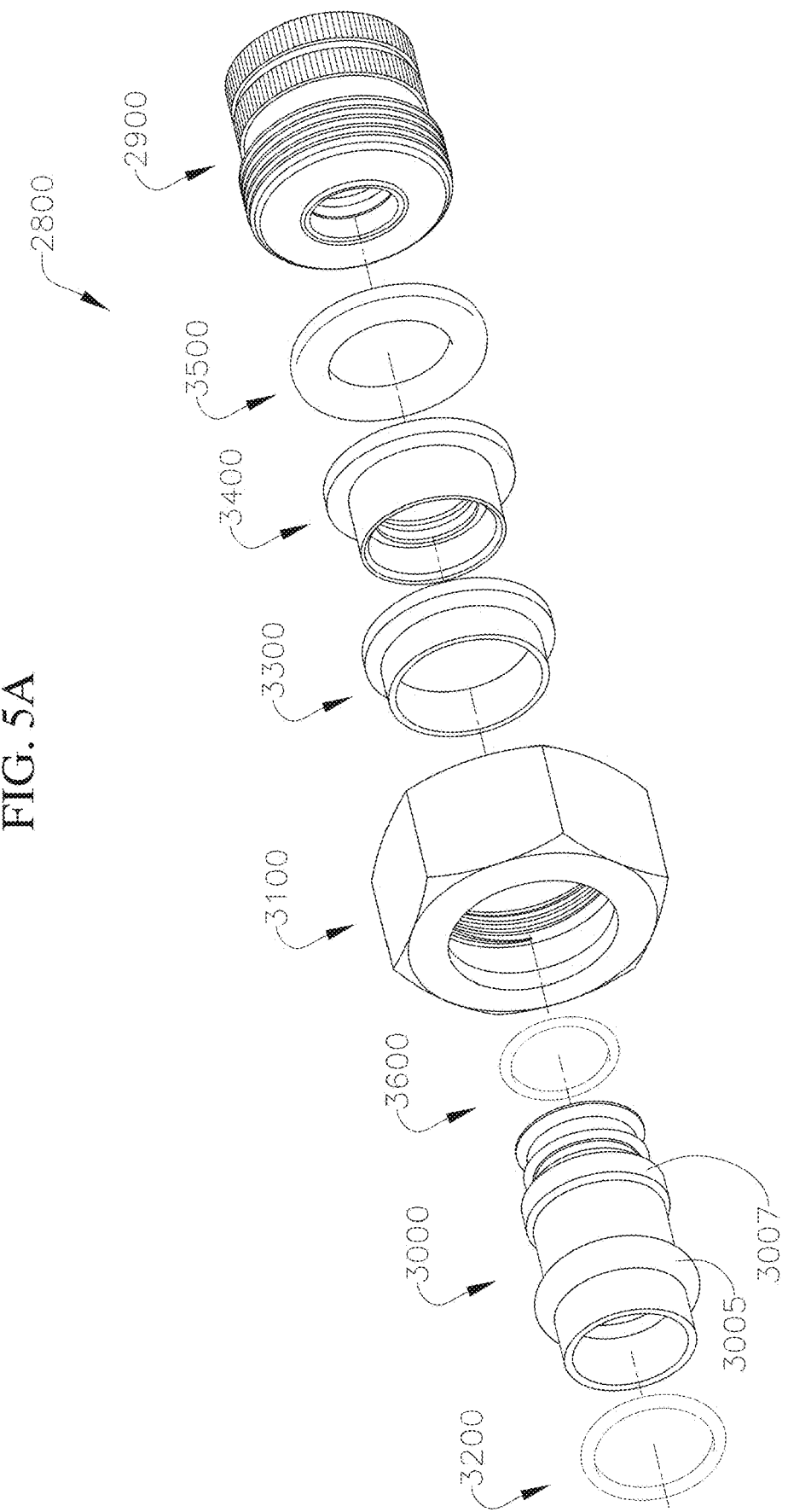
FIGS. 5A-5D are an exploded perspective view, a side view, an end view, and a cross-sectional view, respectively, of a dielectric union assembly according to another embodiment of the present disclosure.
Figure 5C:
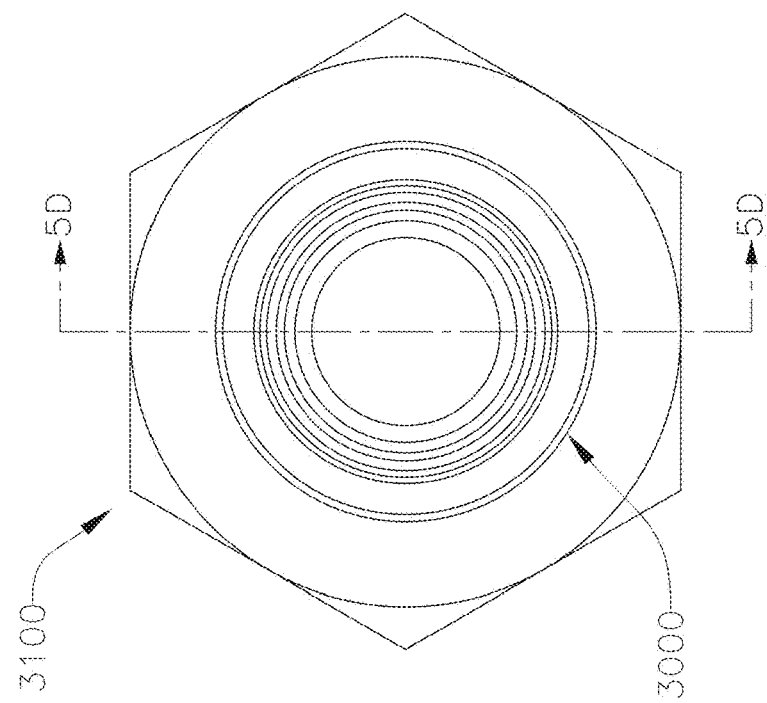
Figure 5B:
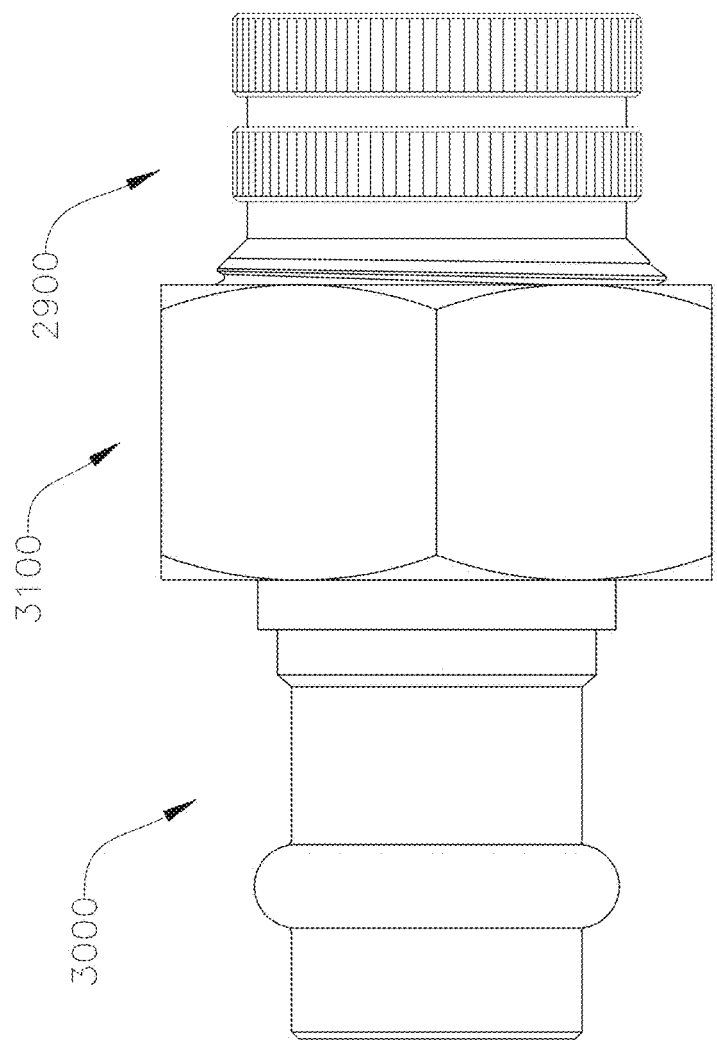
Figure 5D:
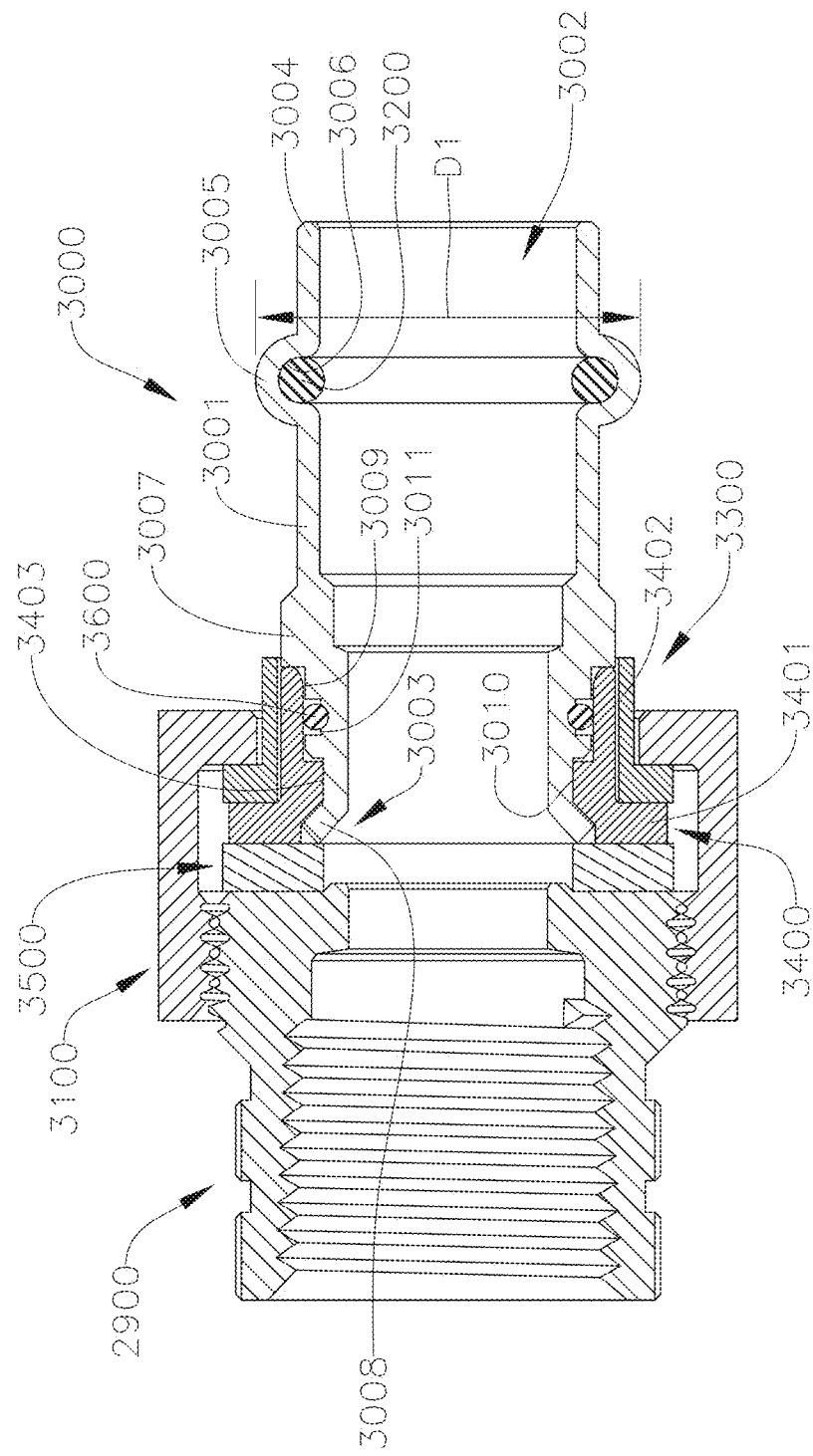
Figure 6A:
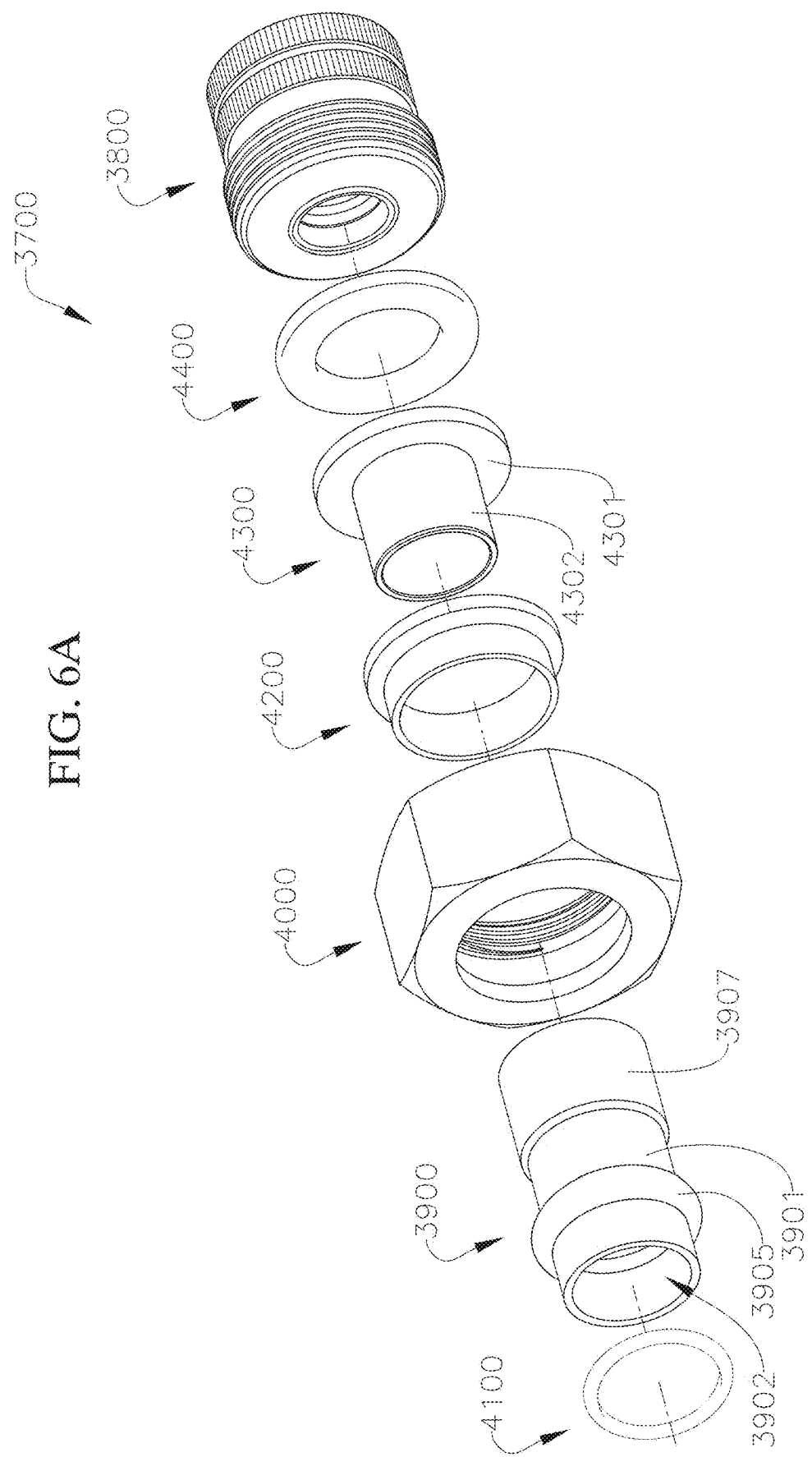
FIGS. 6A-6D are an exploded perspective view, a side view, an end view, and a cross-sectional view, respectively, of a dielectric union assembly according to one embodiment of the present disclosure.
Figure 6C:
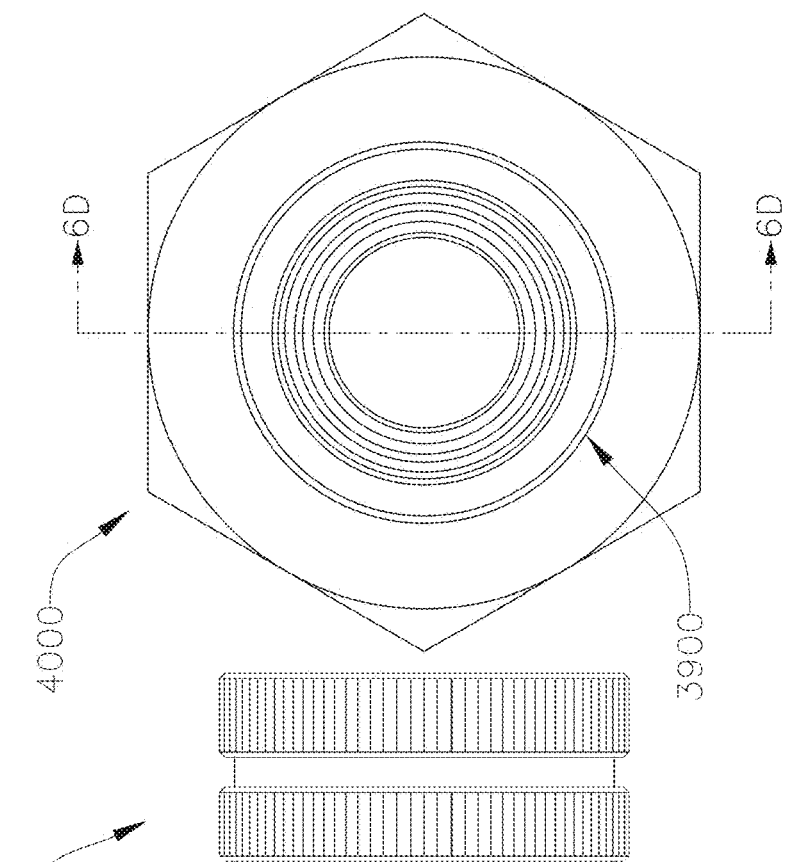
Figure 6B:
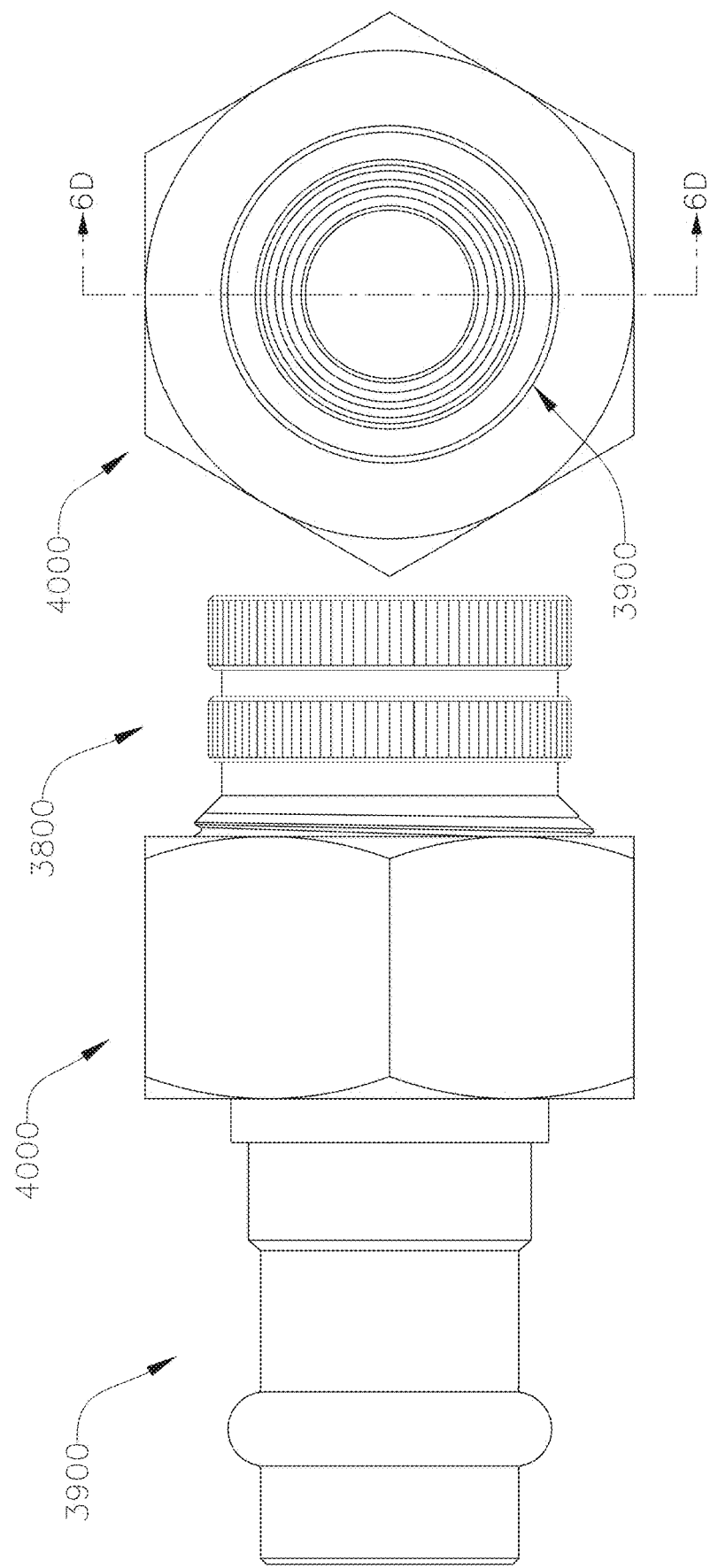
Figure 6D:
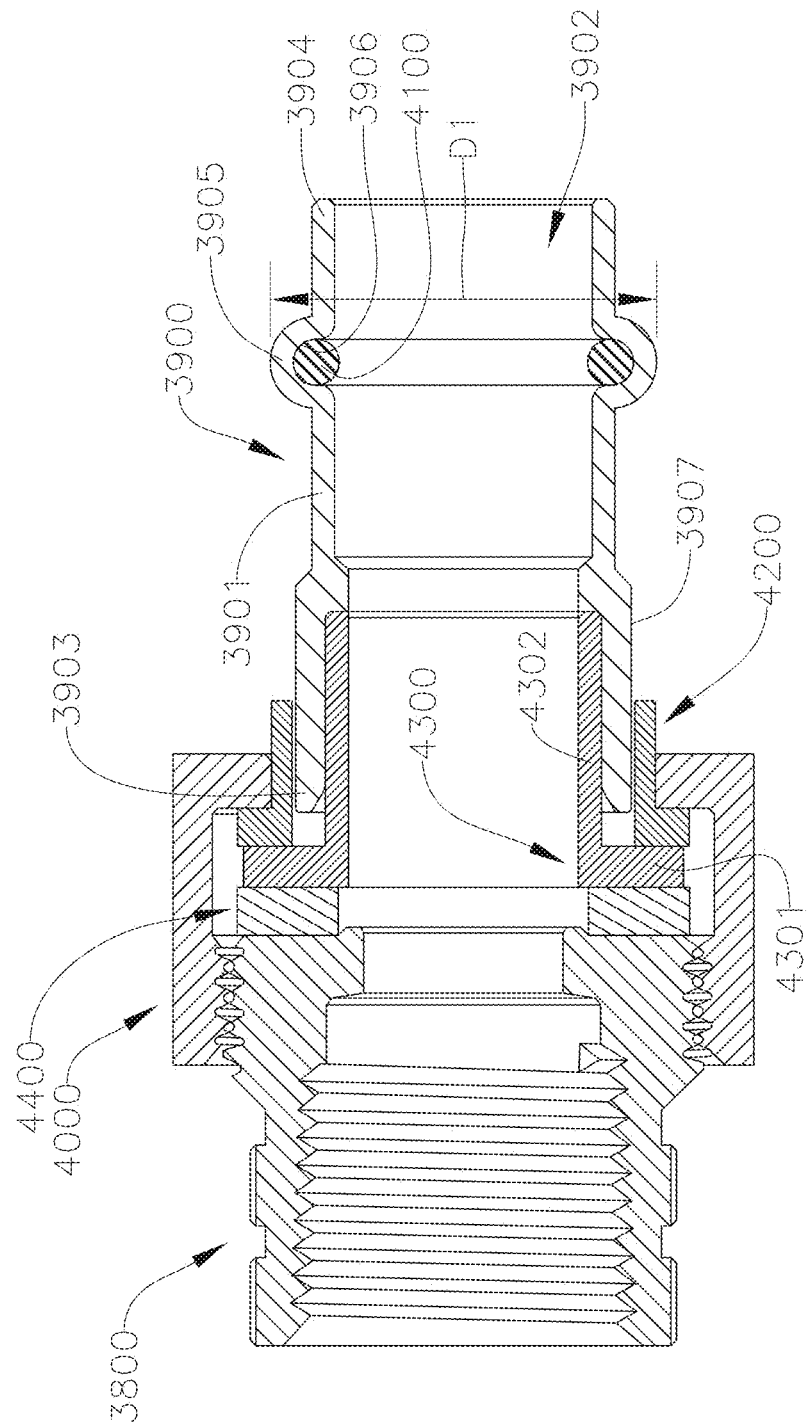

As illustrated in FIG. 2E, the assembly method also includes inserting the gasket 900 into the cylindrical opening 402 of the nut 400 such that the gasket 900 contacts the proximal end portion 303 of the press-fit union body 300, and, as illustrated in FIG. 2F, screwing the threaded union body 200 into the inner threads 405 of the nut 400 until the proximal end portion 203 of the threaded union body 200 abuts the gasket 900. The nut 400 may then be tightened (torqued), to further draw the threaded union body 200 toward the press-fit union body 300, which compresses the gasket 900 between the threaded union body 200 and the press-fit union body 300. Additionally, as the nut 400 is tightened, the annular flange 406 of the nut 400 engages the annular lip 605 of the insert 600 and presses the insert 600 and the flange ring 700 distally, which compresses the retaining ring 800 into the annular groove 307 in the outer surface of the press-fit union body 300.

With reference now to FIGS. 3A-3D, a dielectric union assembly 1000 according to one embodiment of the present disclosure includes a threaded union body 1100, a press-fit union body 1200, a nut 1300, an inner O-ring 1400, an insert 1500, a flange ring 1600, and a gasket 1700. The configurations of the threaded union body 1100, the nut 1300, the inner O-ring 1400 are the same (or substantially the same) as the configurations of the corresponding components in the embodiment depicted in FIGS. 1A-1D, and therefore further description of these components is omitted.

In the illustrated embodiment, the press-fit union body 1200 includes a generally cylindrical body 1201 defining an opening 1202 (e.g., a through hole). The cylindrical body 1201 has a proximal end portion 1203 and a distal end portion 1204. Additionally, in the illustrated embodiment, the press-fit union body 1200 also includes an annular projection 1205 extending radially outward. The annular projection 1205 defines an annular channel 1206 on the inside of the cylindrical body 1201 in communication with the opening 1202. The annular channel 1206 is configured to accommodate the inner O-ring 1400. In the illustrated embodiment, the annular projection 1205 and the annular channel 1206 defined by the annular projection 1205 are proximate to the distal end portion 1204 of the cylindrical body 1201 (i.e., the annular projection 1205 and the annular channel 1206 are closer to the distal end portion 1204 than the proximal end portion 1203). The annular projection 1205 and the annular channel 1206 defined by the annular projection 1205 may have a curved (e.g., semi-annular) cross-sectional shape. In the illustrated embodiment, the annular projection 1205 has an outer diameter D1.

Additionally, in the illustrated embodiment, the press-fit union body 1200 includes a flared portion 1207 that extends radially and proximally outward from the proximal end portion 1203 of the cylindrical body 1201.

In the illustrated embodiment, the press-fit union body 1200 includes an embossed portion 1208 extending outward from the outer surface of the cylindrical body 1201. The embossed portion 1208 is proximate to the proximal end portion 1203 of the cylindrical body 1201. The embossed portion 1208 is configured to support the insert 1500.

Furthermore, in the illustrated embodiment, the press-fit union body 1200 includes an annular groove 1209 in the outer surface of the cylindrical body 1201 between the embossed portion 1208 and the flared portion 1207. The annular groove 1209 is configured to accommodate a portion of the flange ring 1600. The annular groove 1209 may have a prismatic (e.g., trapezoidal) cross-sectional shape.

Furthermore, in the illustrated embodiment, the inner surface of the cylindrical body 1201 includes a transition 1210 (e.g., a step or taper) between a narrower portion 1211 and a wider portion 1212 such that the opening 1202 defined by the cylindrical body 1201 tapers from a narrower diameter portion D2 to a wider diameter portion D3. The narrower portion 1211 extends distally from the proximal end portion 1203 and the wider portion 1212 extends proximally from the distal end portion 1204. Additionally, in the illustrated embodiment, the outer surface of the cylindrical body 1201 includes a transition 1213 (e.g., a step or taper) between the embossed portion 1208 and the annular projection 1205.

When the dielectric union assembly 1000 is assembled, the inner O-ring 1400 is accommodated in the annular channel 1206, the insert 1500 is supported on the embossed portion 1208 on the outer surface of the press-fit union body 1200, the flange ring 1600 is accommodated in the annular groove 1209 and contacts the flared portion 1207, and the nut 1300 engages the threaded union body 1100 and the insert 1500 to draw the threaded union body 1100 and the press-fit union body 1200 toward each other and to compress the gasket 1700 between the threaded union body 1100 and the press-fit union body 1200. The embodiment of the dielectric union assembly 1000 depicted in FIGS. 3A-3D eliminates the retaining ring 800 (e.g., the wire ring) in the embodiment illustrated in FIGS. 1A-2E.

With reference now to FIGS. 4A-4D, a dielectric union assembly 1800 according to one embodiment of the present disclosure includes a threaded union body 1900, a press-fit union body 2000, a nut 2100, an inner O-ring 2200, an insert 2300, a flange ring 2400, a gasket 2500, an outer O-ring 2600, and a retaining ring 2700. The configurations of the threaded union body 1900, the nut 2100, the inner O-ring 2200, the insert 2300, and the gasket 2500 are the same (or substantially the same) as the configurations of the corresponding components in the embodiment depicted in FIGS. 1A-1D, and therefore further description of these components is omitted.

In the illustrated embodiment, the press-fit union body 2000 includes a generally cylindrical body 2001 defining an opening 2002 (e.g., a through hole). The cylindrical body 2001 has a proximal end portion 2003 and a distal end portion 2004. Additionally, in the illustrated embodiment, the press-fit union body 2000 also includes an annular projection 2005 extending radially outward. The annular projection 2005 defines an annular channel 2006 on the inside of the cylindrical body 2001 in communication with the opening 2002. The annular channel 2006 is configured to accommodate the inner O-ring 2200. In the illustrated embodiment, the annular projection 2005 and the annular channel 2006 defined by the annular projection 2005 are proximate to the distal end portion 2004 of the cylindrical body 2001 (i.e., the annular projection 2005 and the annular channel 2006 are closer to the distal end portion 2004 than the proximal end portion 2003). The annular projection 2005 and the annular channel 2006 defined by the annular projection 2005 may have a curved (e.g., semi-annular) cross-sectional shape. In the illustrated embodiment, the annular projection 2005 has an outer diameter D1.

In the illustrated embodiment, the press-fit union body 2000 also includes an embossed portion 2007 extending outward from the outer surface of the cylindrical body 2001. The embossed portion 2007 is proximate to the proximal end portion 2003 of the cylindrical body 2001.

Additionally, in the illustrated embodiment, the press-fit union body 2000 includes a stepped configuration between embossed portion 2007 and the proximal end portion 2003. In the illustrated embodiment, the stepped configuration includes a first step 2008 at the proximal end portion 2003 and a second step 2009 between the first step 2008 and the embossed portion 2007. The first step 2008 includes a first annular groove 2010 configured to accommodate the retaining ring 2700 and the second step 2009 includes a second annular groove 2011 configured to accommodate the outer O-ring 2600.

In the illustrated embodiment, the flange ring 2400 includes a vertical flange 2401 and a horizontal lip 2402 extending from an intermediate portion of the vertical flange 2401 such that a portion of the vertical flange 2401 extends inward beyond the horizontal lip 2402 and a portion of the vertical flange 2401 extends outward beyond the horizontal lip 2402. Additionally, in the illustrated embodiment, an inner surface of the vertical flange 2401 includes an annular recess 2403 configured to accommodate a portion of the retaining ring 2700.

When the dielectric union assembly 1800 is assembled, the inner O-ring 2200 is accommodated in the annular channel 2006, the flange ring 2400 is supported on the stepped portion of the press-fit union body 2000, the retaining ring 2700 is accommodated in the first annular groove 2010 of the press-fit union body 2000 and the annular recess 2403 of the flange ring 2400, the outer O-ring 2600 is accommodated in the second annular groove 2011 of the press-fit union body 2000 and in contact with the horizontal lip 2402 of the flange ring 2400, the insert 2300 is on the flange ring 2400, and the nut 2100 engages the threaded union body 1900 and the insert 2300 to draw the threaded union body 1900 and the press-fit union body 2000 toward each other and to compress the gasket 2500 between the threaded union body 1900 and the press-fit union body 2000.

With reference now to FIGS. 5A-5D, a dielectric union assembly 2800 according to one embodiment of the present disclosure includes a threaded union body 2900, a press-fit union body 3000, a nut 3100, an inner O-ring 3200, an insert 3300, a flange ring 3400, a gasket 3500, and an outer O-ring 3600. The configurations of the threaded union body 2900, the nut 3100, the inner O-ring 3200, the insert 3300, and the gasket 3500 are the same (or substantially the same) as the configurations of the corresponding components in the embodiment depicted in FIGS. 1A-1D, and therefore further description of these components is omitted.

In the illustrated embodiment, the press-fit union body 3000 includes a generally cylindrical body 3001 defining an opening 3002 (e.g., a through hole). The cylindrical body 3001 has a proximal end portion 3003 and a distal end portion 3004. Additionally, in the illustrated embodiment, the press-fit union body 3000 also includes an annular projection 3005 extending radially outward. The annular projection 3005 defines an annular channel 3006 on the inside of the cylindrical body 3001 in communication with the opening 3002. The annular channel 3006 is configured to accommodate the inner O-ring 3200. In the illustrated embodiment, the annular projection 3005 and the annular channel 3006 defined by the annular projection 3005 are proximate to the distal end portion 3004 of the cylindrical body 3001 (i.e., the annular projection 3005 and the annular channel 3006 are closer to the distal end portion 3004 than the proximal end portion 3003). The annular projection 3005 and the annular channel 3006 defined by the annular projection 3005 may have a curved (e.g., semi-annular) cross-sectional shape. In the illustrated embodiment, the annular projection 3005 has an outer diameter D1.

In the illustrated embodiment, the press-fit union body 3000 also includes an embossed portion 3007 extending outward from the outer surface of the cylindrical body 3001. The embossed portion 3007 is proximate to the proximal end portion 3003 of the cylindrical body 3001.

Additionally, in the illustrated embodiment, the press-fit union body 3000 includes a flared portion 3008 that extends radially and proximally outward from the proximal end portion 3003 of the cylindrical body 3001, a step 3009 between the flared portion 3008 and the embossed portion 3007, and a first annular groove 3010 in the outer surface of the cylindrical body 3001 between the step 3009 and the flared portion 3008. The first annular groove 3010 is configured to accommodate a portion of the flange ring 3400. The first annular groove 3010 may have a prismatic (e.g., trapezoidal) cross-sectional shape. The step 3009 includes a second annular groove 3011 configured to accommodate the outer O-ring 3600.

In the illustrated embodiment, the flange ring 3400 includes a vertical flange 3401, a horizontal lip 3402 extending from a lower portion of the vertical flange 3401, and an annular rib 3403 extending inward from horizontal lip 3402.

When the dielectric union assembly 2800 is assembled, the inner O-ring 3200 is accommodated in the annular channel 3006, the flange ring 3400 is supported on the press-fit union body 3000 such that the annular rib 3403 is in the first annular groove 3010 of the press-fit union body 3000, the outer O-ring 3600 is accommodated in the second annular groove 3011 of the press-fit union body 3000 and in contact with the horizontal lip 3402 of the flange ring 3400, the insert 3300 is on the flange ring 3400, and the nut 3100 engages the threaded union body 2900 and the insert 3300 to draw the threaded union body 2900 and the press-fit union body 3000 toward each other and to compress the gasket 3500 between the threaded union body 2900 and the press-fit union body 3000.

With reference now to FIGS. 6A-6D, a dielectric union assembly 3700 according to one embodiment of the present disclosure includes a threaded union body 3800, a press-fit union body 3900, a nut 4000, an inner O-ring 4100, an insert 4200, a flange ring 4300, and a gasket 4400. The configurations of the threaded union body 3800, the nut 4000, the inner O-ring 4100, the insert 4200, and the gasket 4400 are the same (or substantially the same) as the configurations of the corresponding components in the embodiment depicted in FIGS. 1A-1D, and therefore further description of these components is omitted.

In the illustrated embodiment, the press-fit union body 3900 includes a generally cylindrical body 3901 defining an opening 3902 (e.g., a through hole). The cylindrical body 3901 has a proximal end portion 3903 and a distal end portion 3904. Additionally, in the illustrated embodiment, the press-fit union body 3900 also includes an annular projection 3905 extending radially outward. The annular projection 3905 defines an annular channel 3906 on the inside of the cylindrical body 3901 in communication with the opening 3902. The annular channel 3906 is configured to accommodate the inner O-ring 4100. In the illustrated embodiment, the annular projection 3905 and the annular channel 3906 defined by the annular projection 3905 are proximate to the distal end portion 3904 of the cylindrical body 3901 (i.e., the annular projection 3905 and the annular channel 3906 are closer to the distal end portion 3904 than the proximal end portion 3903). The annular projection 3905 and the annular channel 3906 defined by the annular projection 3905 may have a curved (e.g., semi-annular) cross-sectional shape. In the illustrated embodiment, the annular projection 3905 has an outer diameter D1.

In the illustrated embodiment, the press-fit union body 3900 also includes an embossed portion 3907 extending outward from the outer surface of the cylindrical body 3901. The embossed portion 3907 extends from an intermediate portion of the cylindrical body 3901 to the proximal end portion 3903 of the cylindrical body 3901.

In the illustrated embodiment, the flange ring 4300 includes a vertical flange 4301 and a horizontal lip 4302 extending from a lower portion of the vertical flange 4301.

When the dielectric union assembly 3700 is assembled, the inner O-ring 4100 is accommodated in the annular channel 3906, the horizontal lip 4302 of the flange ring 4300 extends into the opening 3902 of the press-fit union body 3900, the insert 4200 is supported on the embossed portion 3907 of the press-fit union body 3900, and the nut 4000 engages the threaded union body 3800 and the insert 4200 to draw the threaded union body 3800 and the press-fit union body 3900 toward each other and to compress the gasket 4400 between the threaded union body 3800 and the press-fit union body 3900. In one or more embodiments, the horizontal lip 4302 of the flange ring 4300 may be soldered to the press-fit union body 3900.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A dielectric union assembly comprising:
a threaded union body comprising external threads;
a press-fit union body comprising an annular groove extending inward and an annular projection extending outward, the annular projection defining an annular channel;
an inner O-ring configured to be accommodated in the annular channel of the press-fit union body;
a nut comprising internal threads at one end and a flange at an opposite end, the internal threads of the nut being configured to threadedly engage the external threads of the threaded union body;
an insert configured to dielectrically isolate the threaded union body and the nut from the press-fit union body;
a flange ring comprising an annular recess;
a retaining ring configured to fit into the annular recess of the flange ring and to hold the flange ring in place; and
a gasket configured to be compressed between the threaded union body and the press-fit union body,
wherein an inner diameter of the flange of the nut is less than or substantially equal to an outer diameter of the annular projection, and
wherein the nut is configured to be mounted from a first end of the press-fit union body opposite to a second end of the press-fit union body comprising the annular projection.

2. The dielectric union assembly of claim 1, wherein the annular projection is a widest portion of the press-fit union body.

3. The dielectric union assembly of claim 1, wherein the retaining ring is a wire ring.

4. The dielectric union assembly of claim 3, wherein the wire ring comprises phosphor bronze.

5. The dielectric union assembly of claim 1, wherein the press-fit union body comprises a narrower inner end portion and a wider outer end portion.

6. The dielectric union assembly of claim 5, wherein the press-fit union body further comprises a transition between the narrower inner end portion and the wider outer end portion.

7. The dielectric union assembly of claim 6, wherein the press-fit union body further comprises an embossed portion configured to support the insert.

8. The dielectric union assembly of claim 1, wherein the insert comprises an annular lip extending outward, and wherein the flange of the nut is configured to engage the annular lip of the insert.

9. The dielectric union assembly of claim 1, wherein, in an assembled state:
the flange ring is on an outer surface of the press-fit union body;
the insert is on the outer surface of the press-fit union body, the insert being between the flange ring and the annular projection;
the inner O-ring is accommodated in the annular channel of the press-fit union body;
the retaining ring is accommodated in the annular groove of the press-fit union body and the annular recess of the flange ring;
the internal threads of the nut engage the external threads of the threaded union body;
the flange of the nut engages an annular lip of the insert; and
the gasket is compressed between the threaded union body and the press-fit union body.

10. The dielectric union assembly of claim 1, wherein the threaded union body further comprises a pipe system connection.

11. The dielectric union assembly of claim 10, wherein the pipe system connection comprises internal threads.

12. A method of assembling a dielectric union assembly, the method comprising:
providing the dielectric union assembly of claim 1;
sliding the nut onto the press-fit union body, wherein the nut does not pass over the annular projection of the press-fit union body;
sliding the insert onto the press-fit union body through the nut;
sliding the flange ring onto the press-fit union body through the nut;
inserting the retaining ring into the annular groove in the press-fit union body; and
threadedly coupling the threaded union body to the nut.

* * * * *